E. J. ILES AND O. L. HASTINGS.

CURING HOUSE FOR SWEET POTATOES.

APPLICATION FILED MAR. 8, 1921.

Reissued July 19, 1921.

15,156.

3 SHEETS—SHEET 1.

Inventors

Elijah Jasper Iles and

By Odie Lee Hastings

Frank S. Ashenhurst, Attorney.

E. J. ILES AND O. L. HASTINGS.

CURING HOUSE FOR SWEET POTATOES.

APPLICATION FILED MAR. 8, 1921.

Reissued July 19, 1921. 15,156.

3 SHEETS—SHEET 2.

Inventors

Elijah Jasper Iles and

By Odie Lee Hastings

Frank A. Apleman, Attorney.

E. J. ILES AND O. L. HASTINGS.

CURING HOUSE FOR SWEET POTATOES.

APPLICATION FILED MAR. 8, 1921.

Reissued July 19, 1921. 15,156.

3 SHEETS—SHEET 3.

Inventors

Elijah Jasper Iles and

By Odie Lee Hastings

Frank S. Appleman, Attorney.

UNITED STATES PATENT OFFICE.

ELIJAH JASPER ILES AND ODIE LEE HASTINGS, OF ALEXANDRIA, LOUISIANA, ASSIGNORS TO ALEXANDRIA POTATO CURING COMPANY, INC., OF ALEXANDRIA, LOUISIANA, A CORPORATION OF LOUISIANA.

CURING-HOUSE FOR SWEET POTATOES.

15,156. Specification of Reissued Letters Patent. Reissued July 19, 1921.

Original No. 1,353,752, dated September 21, 1920, Serial No. 387,559, filed June 9, 1920. Application for reissue filed March 8, 1921. Serial No. 450,604.

*To all whom it may concern:*

Be it known that we, ELIJAH JASPER ILES and ODIE LEE HASTINGS, citizens of the United States of America, and residents of Alexandria, in the parish of Rapides and State of Louisiana, have invented certain new and useful Improvements in Curing-Houses for Sweet Potatoes, of which the following is a specification.

The present invention relates to the storing and curing of vegetables such as sweet potatoes or other products and has for its object the provision of novel means for maintaining uniform heat of a predetermined degree and for effecting its circulation around or through the product for the purpose of quite uniformly treating all of the product contained within the apparatus or house; novel means being also provided for effecting an indirect communication between the interior of the curing house and the atmosphere externally thereof.

Figure 1:
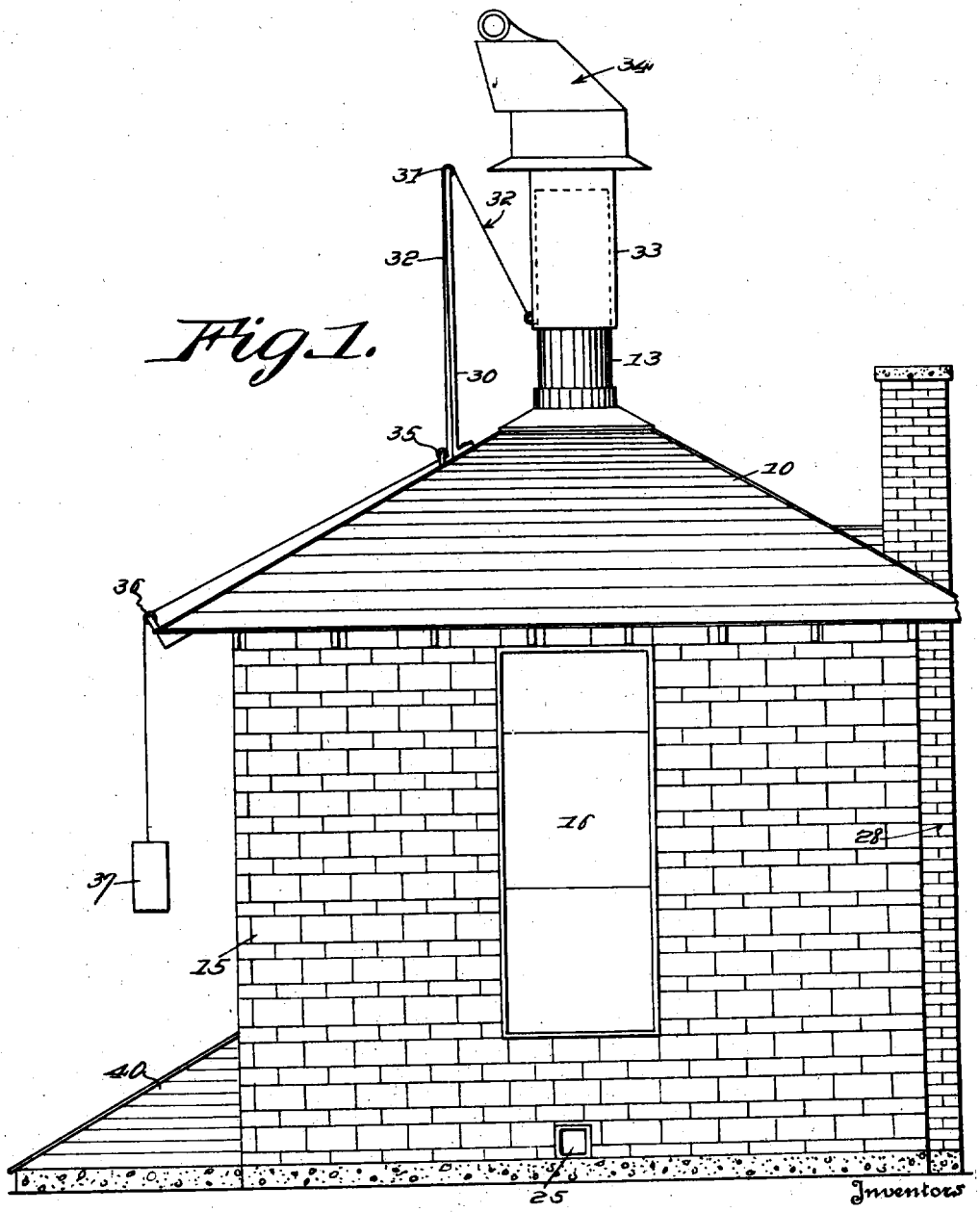
Figure 2:
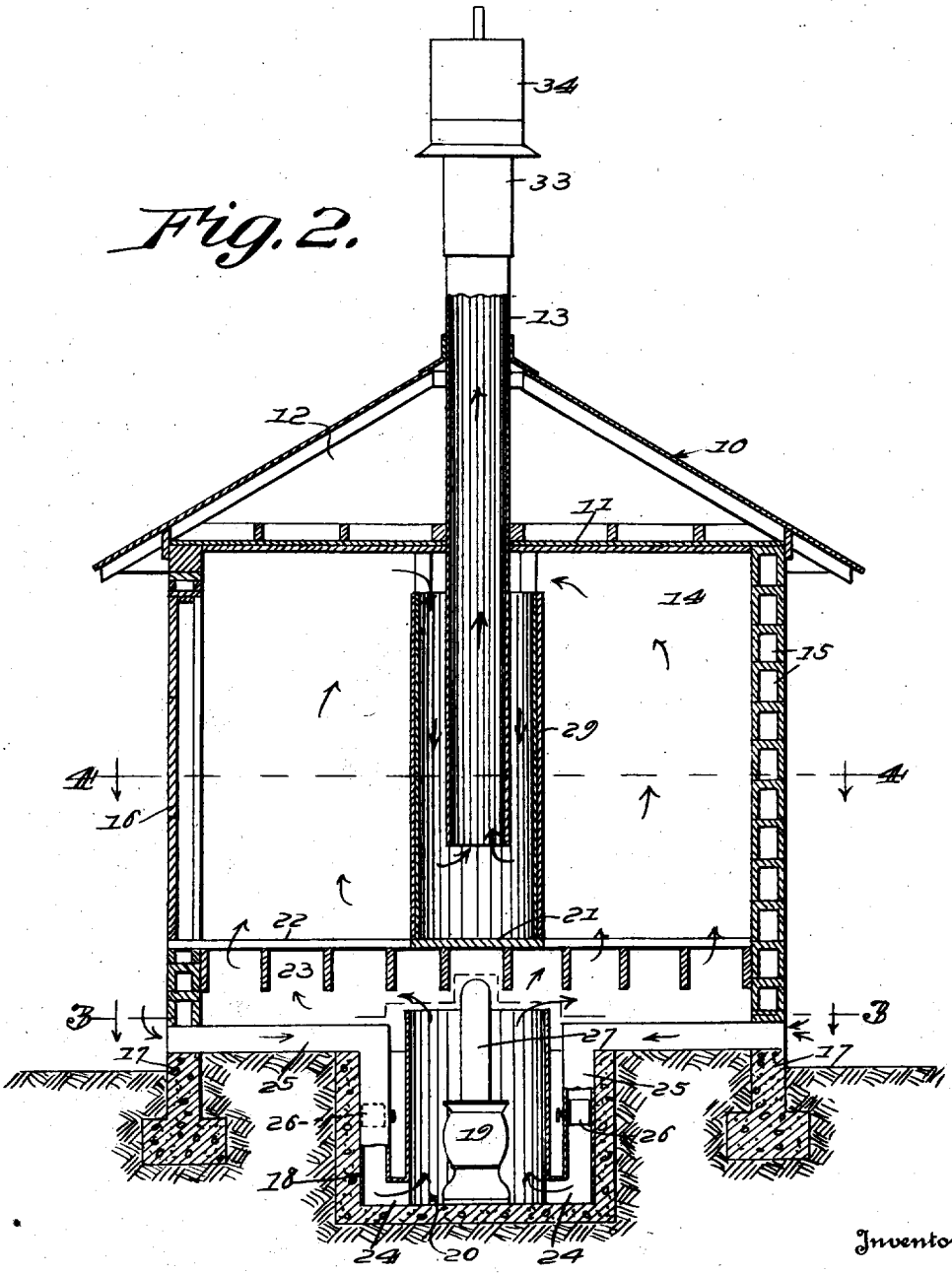
Figure 4:
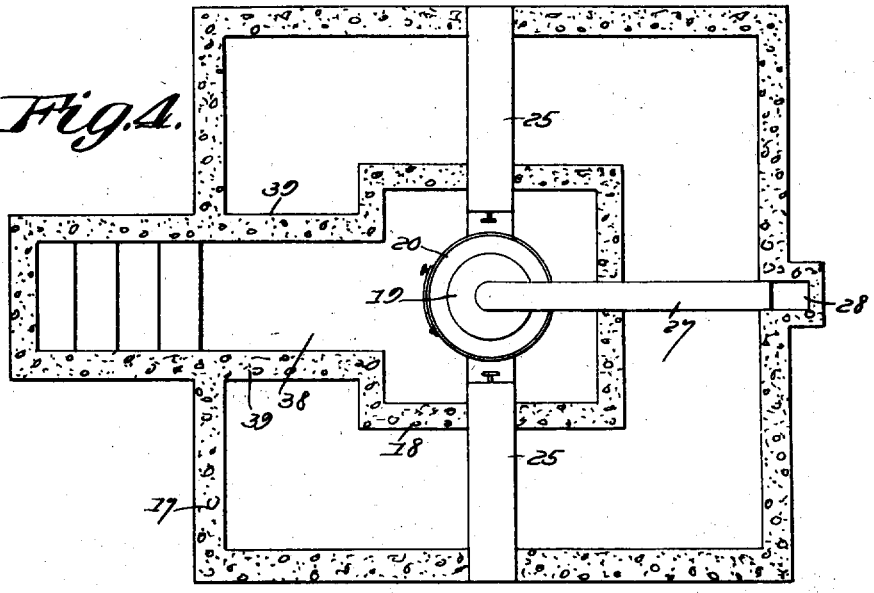
Figure 3:
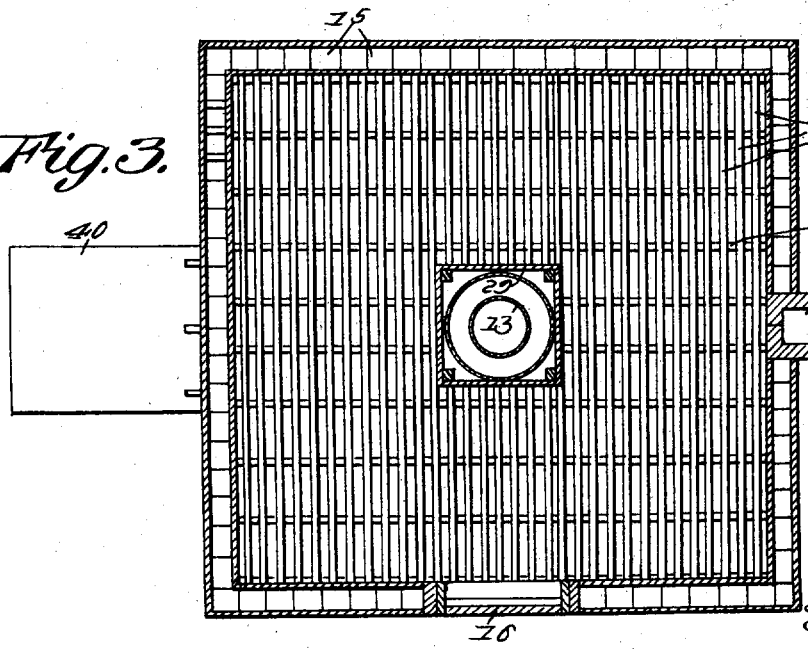

In the accompanying drawings illustrating the present invention and forming a part of this application, Figure 1 illustrates a side elevation of our improved curing house;

Fig. 2 illustrates a vertical transverse section taken centrally therethrough; and Figs. 3 and 4 illustrate horizontal sections taken respectively on lines 3—3 and 4—4 of Fig. 2.

The illustration is intended to disclose one embodiment of the invention and includes a curing house or closure preferably provided with a centrally apertured peaked roof 10 over a centrally apertured and insulated ceiling 11 with a dead air space 12 between the ceiling and roof through which an outlet flue 13 extends. The said flue projects through the openings of the roof 10 and ceiling 11 above the roof, whereas its lower end depends into a curing chamber 14 inclosed by walls 15 which may be formed of hollow tile for insulating purposes, and one of the walls may have a charging door 16. The walls 15 are suitably supported, as in the present showing, by a foundation including cement wall footings 17 which are in spaced relation to walls 18 of a heating pit in which a heater 19 of any suitable character is stationed. A drum 20 embraces the sides of the heater and in this embodiment, the drum is of upright cylindrical form having its lower end resting on the base of the pit and its upper end opening in a plane beneath a charging floor having a central solid section 21, a reticulated section 22 on supporting beams 23.

The lower portion of the heating drum 20 has diametrically opposed openings 24 with which the inner ends of the air flues 25 communicate, these air flues having their outer ends opening exteriorly through the lower portions of opposite side walls 15 and having controlling dampers 26 in their length, preferably located within the heating pit at opposite sides of the drum 20 and thus within ready reach for purposes of adjustment. The outlet flue 27 of the heater 19 preferably leads at right angles to the air flues 25 as particularly seen in Figs. 2 and 4, to the lower end of a chimney 28 with which one of the side walls 15 is provided.

A hollow member 29 such as a cylinder or drum, preferably insulated, is located in the curing chamber and it has its lower end closed, in the present embodiment, by reason of the fact that it rests on the central solid section 21 of the charging floor 22, and the said hollow member is so disposed within the curing chamber as to receive the lower end of the outlet flue 13. The hollow member, which may be termed a circulating cylinder, preferably has its open end terminating in spaced relation to the ceiling 11 into which the circulating air, rising in the curing chamber 14 passes, the said heated air being forced to descend into the open end of the circulating cylinder before reaching the lower end of the outlet flue 13, the latter of which terminates in spaced relation to the closure of the lower end of the hollow member. By reason of the foregoing relation of parts, provision is made for causing the circulation of heated air throughout the curing chamber evenly through the products, which are preferably crated or placed in containers which may be piled upon one another and supported in the curing chamber.

In order to regulate the draft assisting to produce this circulation, we preferably provide the roof 10 with an upright 30 supporting a pulley 31 at its upper end over which a flexible connection 32 extends. This connection is secured at one end to the lower portion of the depending tube 33 of a rotatable cowl 34, the said tube 33 of which adjustably telescopes the upper end of the flue 13. The flexible connection 32 extends downwardly around pulleys 35 and 36 and is secured at its other end to a counterweight 37, the function of the latter of which is to maintain the cowl in vertically adjusted position and maintain desired effective length of the flue 13.

The heating pit is entered through a passage way 38 seen particularly in Fig. 4, the walls 39 of which join certain of the wall footings 17 with the walls 18 of the heating pit, and the outer end of this passage way is closed by a door 40.

In charging the curing house, the charging doors 16 are removed and the commodity to be cured, preferably in crates as above stated, is carried into the curing chamber directly from wagons, trucks and the like by which the commodity has been transported from the field, and after being charged, the door 16 is again placed in closed position and after adjustment of the extension tube of the circulation outlet flue 13, the heater 19 is started and the air flue dampers 26 adjusted. Air taken into these air flues 25 passes into the drum 20 and becomes heated by the close proximity to the heater, the heated air rising upwardly through the charging floor 22 around its central solid section 21 and thus around the cylinder 29. Further passage of the air has been previously described, and it is obvious that our invention as thus constructed and adapted to operate is capable of erection and effective operation in different localities, that is where the weather conditions are different, and is calculated at all times to maintain a thorough circulation of heated air throughout the curing chamber. This is particularly important in connection with the curing of sweet potatoes which require a steady thorough circulation for successful curing at a moderate heat.

We claim:

1. A curing house having insulating walls, a heating pit, a reticulate charging floor having a central solid section above the heating pit, a cylinder rising from and having its lower end closed by the said central section, the upper end of the cylinder being open, a roof, and an outlet flue extending downwardly through the roof with its lower portion projecting downwardly into the said cylinder in spaced relation.

2. A curing house having insulating walls, a heating pit, a reticulate charging floor having a central solid section above the heating pit, a cylinder rising from and having its lower end closed by the said central section, the upper end of the cylinder being open, a roof, and an outlet flue extending downwardly through the roof with its lower portion projecting downwardly into the said cylinder in spaced relation, and a vertically adjustable tube telescoping the upper outer end of said flue and movable for draft adjusting purposes.

3. A curing house having insulating walls, a heating pit, a reticulate charging floor having a central solid section above the heating pit, a cylinder rising from and having its lower end closed by the said central section, the upper end of the cylinder being open, a roof, and an outlet flue extending downwardly through the roof with its lower portion projecting downwardly into the said cylinder in spaced relation, a tube telescoping the upper outer end of said flue to form an adjustable draft extension, and means for adjusting said tube and holding the same in adjusted position.

4. A curing house having insulating walls, a heating pit, a reticulate charging floor having a central solid section above the heating pit, a cylinder rising from and having its lower end closed by the said central section, the upper end of the cylinder being open, a roof, and an outlet flue extending downwardly through the roof with its lower portion projecting downwardly into the said cylinder in spaced relation, a tube telescoping the upper outer end of said flue to form an adjustable draft extension, and means for adjusting said tube and holding the same in adjusted position, including flexible connections and a controlling counterweight for said connections as described.

5. A curing house including means forming a curing chamber having a reticulate charging floor, a vertical cylinder in the curing chamber having a closed lower end and an open upper end, an outlet air flue having a lower open end depending into said cylinder, a heating pit below the charging floor, a heater in said pit, a drum around the heater having an upper open end below the charging floor, an outlet flue for the heater, and air intake flues communicating with the lower portion of the drum and having controlling dampers as described.

6. In a device of the character described, means forming a curing chamber having a reticulate charging floor provided with a central solid section, a cylinder rising within the curing chamber and opening at its upper end adjacent to the top of the chamber, the lower ends of said cylinder being disposed on and closed by the central solid section of the charging floor, an outlet flue the lower end of which depends into the said cylinder in spaced relation thereto and terminates above the charging floor, and air heating means located below the charging floor for circulating heated air upwardly through the reticulate portion of the charging floor and into the curing chamber.

7. A curing house having a curing chamber, means for supporting products in the said chamber, a hollow member in the curing chamber having a closed lower end and an opening for the admission of air, an outlet air flue extending into the hollow member and communicating with the atmosphere outside of the curing chamber, and means in communication with the curing chamber for supplying heat thereto.

8. A curing house, a curing chamber having a support for the product to be cured, a hollow member having a closed lower end and an open end in spaced relation to the top of the curing chamber, means for supplying heated air to the curing chamber, and an outlet flue extending into the open end of the hollow member and communicating with the atmosphere externally of the curing chamber.

9. A curing house including means forming a curing chamber having a support through which air may circulate for the product to be cured, a vertical cylinder in the curing chamber having a closed lower end and an open upper end, an outlet air flue having a lower open end depending into the said cylinder, a heating pit below the support, a heater in the said pit, and a drum around the heater having an upper open end below the support.

10. A curing house including means forming a curing chamber having a reticulate charging floor, a vertical cylinder in the curing chamber having a closed lower end and an open upper end, an outlet air flue having a lower open end depending into the said cylinder, a heating pit below the charging floor, a heater in the said pit, a drum around the heater having an upper open end below the charging floor, and means for admitting air to the lower portion of the drum.

11. A curing house including means forming a curing chamber having supports for the commodity to be treated, a hollow member having a closed lower end and being open to the atmosphere of the curing chamber above the said lower end, means for supplying heated air below the commodity supports whereby air rises in the curing chamber, and an outlet flue in communication with the hollow member, the said outlet flue communicating with the atmosphere externally of the curing chamber.

ELIJAH JASPER ILES.
ODIE LEE HASTINGS.